April 1, 1969　　J. C. GLENZER　　3,436,086
TOOL HOLDER
Filed May 31, 1966
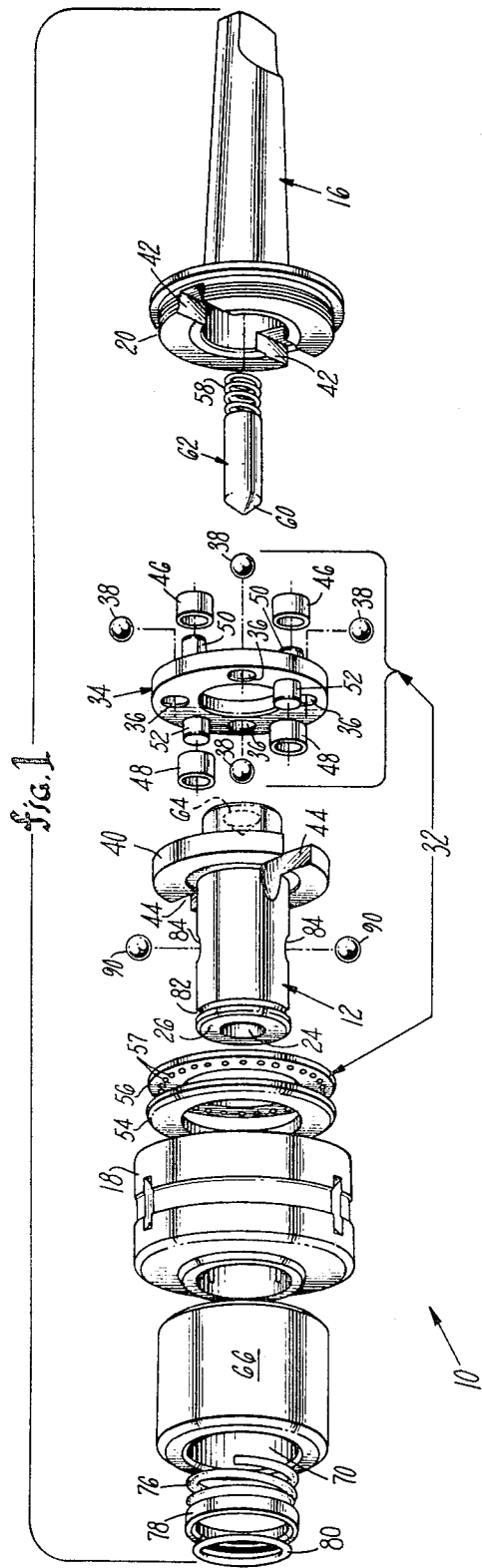
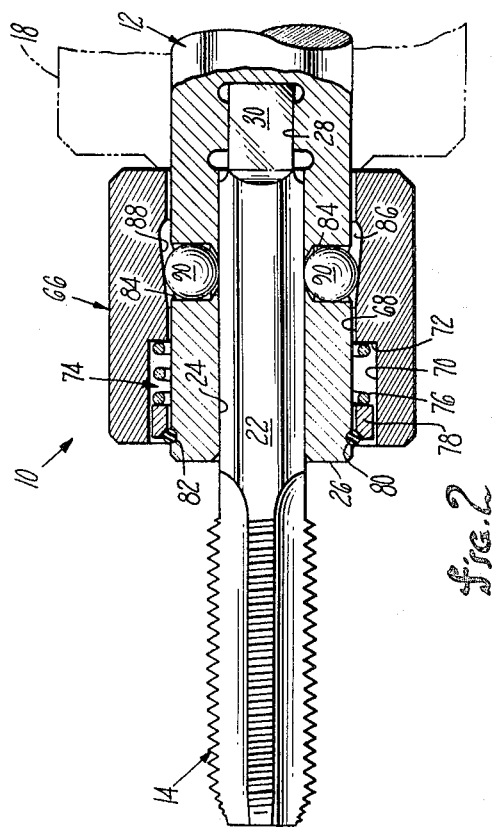
*INVENTOR.*
JOHN C. GLENZER
BY *Lindsey, Prutzman and Hayes*
ATTORNEYS

United States Patent Office 3,436,086
Patented Apr. 1, 1969

3,436,086
TOOL HOLDER
John C. Glenzer, Lathrup Village, Mich., assignor to The Hanson Whitney Company, Hartford, Conn., a corporation of Connecticut
Filed May 31, 1966, Ser. No. 553,870
Int. Cl. B23b *31/22, 5/34, 31/16*
U.S. Cl. 279—30  2 Claims

ABSTRACT OF THE DISCLOSURE

A tool holder particularly useful in multiple spindle machine tools includes a spindle having a longitudinal bore at its free end for receiving a tool shank, the spindle being radially apertured for confining movable locking ball elements. A coaxial cylindrical axially sidable sleeve fits around the spindle and includes an internal ramp disposed to wedge the locking balls radially inwardly against a tool shank within the spindle bore when the sleeve is biased toward its rearmost position. The sleeve is provided with an annular recess at the free end to house a coil biasing spring which is seated against a retaining ring secured by an O ring positioned in a peripheral groove near the free end of the spindle so that the sleeve may be assembled and removed over the free end of the spindle without removal of the spindle from the machine.

---

This invention generally relates to tool holders and a primary object of the invention is to provide an improved tool holder which is quick and easy to operate by hand to install or change a tool. Included in this object is the aim of providing an improved tool holder which is particularly designed to prevent accidental tool release during a high speed production operation.

A further object of the invention is to provide a tool holder of the above-described type which is capable of compensating for misalignment between the work and the tool and which incorporates an improved lock mechanism for retaining accurate alignment of the tool for close tolerance work.

Another object of the invention is to provide an improved tool holder suitable for use in automatic multiple spindle machines and which is capable of applying a high compressive force to a tool shank for holding the tool and for also securely maintaining it in a properly aligned operating position within the tool holder.

Still another object of the invention is to provide an improved tool holder which is of compact construction specifically suited for low-cost manufacture and assembly and which is durable to provide long reliable service under rugged operating conditions.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawing:
FIG. 1 is an exploded isometric view showing a tool holder incorporating the present invention; and
FIG. 2 is an enlarged section view, partly in phantom and partly broken away, of a forward end portion of the tool holder showing a cutting tool being held in an operating position.

Referring now in detail to the drawing wherein a preferred embodiment of the invention is illustrated, a tool holder 10 is shown having a cylindrical housing or float sleeve 12 provided with a tubular forward end portion for holding a cutting tool such as the illustrated tap 14. Positioned rearwardly of the float sleeve 12 is a conventional elongated shank 16. As described more specifically below, the float sleeve 12 is maintained in assembled relation with the shank 16 by means which include a cup-shaped cap 18 which may be screwed onto an externally threaded end flange 20 at the forward end of the shank 16.

It will be understood that the shank 16 is adapted to be fixed relative to the float sleeve 12 and may be mounted on a machine such as an automatic multiple spindle machine of well-known design incorporating a number of axially reciprocable rotary spindles, not shown, for performing a variety of operations on a workpiece such as drilling, reaming, tapping and similar high speed production operations. In the specific illustrated embodiment, the tap 14 includes a cylindrical shank 22 closely fitted in a cylindrical opening or bore 24 extending axially rearwardly from a forward end 26 of the float sleeve 12 to a square hole 28 which receives a squared end 30 of the tap shank 22 for driving the same upon rotation of the float sleeve 12.

To rotate the float sleeve 12, a driving connection is provided for transmitting to the float sleeve 12 rotary movements of the shank 16 effected upon spindle rotation. The driving connection between the shank 16 and the float sleeve 12 includes a compensator unit 32 for ensuring that the tool holder 10 will effect compensating movements under load to obtain positive correction for misalignment on spindles which, through use, have become worn and out of alignment.

A compensator ring 34 is shown having four openings 36 therein which are equally spaced apart at 90° intervals for receiving four balls 38. The balls 38 maintain opposite sides of the compensator ring 34 in spaced relation to the end flange 20 of the shank 16 and a radial flange 40 formed on the float sleeve 12 adjacent its rear end. The flanges 20 and 40 each have a pair of aligned radial slots 42 and 44 formed in perpendicular relation to one another. Each pair of radial slots 42 and 44 are dimensioned for receiving a pair of driving bushings 46 and 48 which are fitted onto corresponding pairs of lugs 50 and 52 whereby a predetermined clearance is provided between the bushings 46, 48 and their respective slots 42, 44. Each pair of lugs 50 and 52 are integrally formed on opposite sides of the compensator ring 34, respectively, adjacent the flanges 20 and 40. Thus, the lugs of each pair of lugs 50 and 52 are in diametrically opposed relation so as to be received, along with their respective bushings 46 and 48, in the slots 42 and 44 for drivingly connecting the float sleeve 12 to the shank 16.

Before screwing the cup-shaped cap 18 onto the end flange 20 to hold the components together, a thrust washer 54 is seated in the cap 18, and a ball retainer 56 of the compensator unit 32 is interposed between the thrust washer 54 and the radial flange 40 of the float sleeve 12. The ball retainer 56 is provided with a series of small hardened steel bearing balls 57 mounted in an annular arrangement to allow the float sleeve 12 to float freely within the confines of the cap 18.

By this arrangement, the float sleeve 12 is adapted to move laterally off-center relative to the shank 16 when misalignment exists between the longitudinal axis of the tap 14 and the work, but the longitudinal axis of the float sleeve 12 and the shank 16 will be continuously maintained in parallel relation. Upon off-center lateral movement of the float sleeve 12, the driving bushings 46, 48 will effect minimal friction resistance during their compensating sliding movements within their slots 42, 44. A biasing force is preferably exerted on the float sleeve 12 by a spring 58 seated inside a bore of the shank 16 for continuously urging a conical tip 60 of a plunger 62 into seating engagement in a central recess 64 formed in the rear end of the float sleeve 12.

In the course of a tapping operation, it is of paramount importance that the tap 14 be securely maintained within the above-described compensating tool holder 10. For this reason, the tool holder 10 is provided with a locking mechanism which not only ensures that the tap 14 will be firmly held in a properly aligned operating position for close tolerance work, but also provides for quick and easy tool replacement without having to resort to the use of any special hand tools.

More specifically, the tool holder 10 includes a retaining member or operating sleeve 66 which coaxially surrounds the tubular forward end portion of the float sleeve 12 upon being fitted over its forward end 26. The operating sleeve 66 has an internal wall surface defined jointly by a central bore 68 and a counterbored forward end portion 70. An annular shoulder 72 is provided at the juncture of the central bore 68 and the counterbored forward end portion 70. The latter in conjunction with the float sleeve 12 defines an annular compartment 74 for receiving a coil compression spring 76. Opposite ends of the coil compression spring 76 are seated against the annular shoulder 72 and a retaining ring 78. The retaining ring 78 is maintained against axial displacement by an O ring 80 which is seated in an external peripheral groove 82 circumferentially extending around the float sleeve 12 adjacent its forward end 26. By this arrangement, the operating sleeve 66 is continuously biased rearwardly of the float sleeve 12 toward the cup-shaped cap 18.

The float sleeve 12 is shown having a pair of diametrically opposed holes 84 formed therein to extend transversely with respect to its longitudinal axis. The holes 84 are equidistant from the forward end 26 of the float sleeve 12. Corresponding with each hole 84 is a forwardly tapered pocket 86, preferably formed by an annular groove around the inside of the operating sleeve 66, which provides a longitudinally extending recessed ramp or locking taper 88 which slopes forwardly in the order of 5° relative to the axis of the operating sleeve 66 to merge with its internal wall surface. Received in each hole 84 is a locking member or ball 90, the diameter of which is dimensioned greater than the wall thickness of the float sleeve 12.

When the operating sleeve 66 is positioned in its illustrated rear operative position, each ball 90 is compressively wedged between its recessed ramp 88 and the cylindrical shank 22 of the tap 14 to exert a high frictional force which positively locks the tap 14 against any longitudinal movement relative to the float sleeve 12. The operating sleeve 66 will be normally maintained in this position by virtue of the continuous biasing force of the coil compression spring 76.

When it is desired to remove or replace the tap 14, the operating sleeve 66 is merely pulled axially outwardly from its illustrated operative position into a forward release position wherein each locking ball 90 is released from locking engagement between its ramp 88 and the shank 22 due to the forwardly tapered construction of the pockets 86 which continuously register with their corresponding holes 84 throughout the longitudinal movement of the operating sleeve 66 relative to the float sleeve 12. This can be accomplished entirely by hand without the use of any tools. After the tap 14 is removed and a new tool is inserted directly into the float sleeve 12, e.g., the operating sleeve 66 is simply released to spring back into its illustrated rear operative position whereby each locking ball 90 will be wedged by its ramp 88 directly into locking engagement with the shank of the new tool.

To prevent the locking balls 90 from falling into the bore 24 of the float sleeve 12 during tool removal, the inner end of each ball retaining hole 84, which is in communication with the bore 24, is reduced in size relative to the ball diameter. The ball diameter is of preselected dimension greater than the wall thickness of the float sleeve 12, as described above, such that upon being seated in the reduced inner end of the hole 84 when the tap 14 is completely removed, each locking ball 90 has an outer protruding segment projecting from the float sleeve 12 for engaging its internal wall surface to obstruct the operating sleeve 66 against rearward movement. Thus, the locking balls 90 cooperate with the portions of the float sleeve 12 surrounding the holes 84 thereby to additionally serve to hold the operating sleeve 66 on the float sleeve 12 against excessive rearward movement even in the absence of an abutment such as provided by the cap 18. While the inside diameter of the operating sleeve 66 rearward of the pocket 88 is slightly enlarged relative to the central bore 68 to permit the operating sleeve 66 to be fitted over the locking balls 90 and to facilitate assembly, excessive forward movement is limited by the convolutions of the coil compression spring 76 which provide a stop for the operating sleeve 66 upon being compressed into a solid cylinder.

It will be apparent that an operating sleeve of the above-described type can be fitted on float sleeves having different internal diameters for accommodating different tool sizes without requiring the use of any secondary sleeves to firmly maintain the tool in proper operating position.

A particular advantage of the tool holder 10 is that any interference from an external object which would effect an axial force on the operating sleeve 66 in a rearward direction at any time during a cutting operation, and especially during a forward stroke of the tool holder 10, will automatically result in pressing the forwardly sloping ramps 88 even more tightly against the locking balls 90 to provide an increased compressive locking force on the shank of the tool.

Thus, the above-described tool holder virtually eliminates accidental tool release. The self-locking feature at once provides a holding force of high magnitude for securely maintaining the tool in its holder. The time involved in replacing a tool is minimal, and such replacement may be accomplished entirely by hand without having to resort to the use of special tools which is so often time consuming and inconvenient because of space limitations. In addition to ensuring speed and efficiency in high speed production operations, the construction of the tool holder incorporates a minimum number of parts in a compact rugged structure which is durable in operation and which is particularly suited for low cost manufacture and assembly.

As will be apparent to persons skilled in the art, various modifications and adaptations of the structure above-described will become readily apparent without departure from the spirit and scope of the invention, the scope of which is defined in the appended claims.

I claim:

1. A quickly releasable foolproof tool holder for securing a tool having a cylindrical shank in the bore of the free end of a drive spindle having an outer periphery of substantially uniform cross section wherein said free end is provided with radial aperture means spaced from the free end of the spindle, locking ball means are positioned in the aperture means, and a one-piece sleeve coaxially surrounds the free end of the spindle and is closely fitted thereon for relatively longitudinal movement, the improvement wherein the internal wall of said sleeve is provided with a tapered inner surface having a taper which diverges away from the free end of the spindle and engages the locking ball means for holding the same against the cylindrical shank of the tool when the sleeve is biased away from the free end of the spindle, the sleeve further having a counterbore at one end to provide an annular recess surrounding the free end of the spindle, a biasing spring within said counterbore and seated against a retaining ring secured against movement toward the free end of the spindle by a resilient O ring positioned in a peripheral groove at the free end of the spindle whereby the sleeve, the spring, the retaining ring and the O ring may be assembled and disassembled over the free end of the spindle.

2. A device as recited in claim 1 wherein the tool holder includes a plurality of radial apertures equiangularly spaced about the periphery of the spindle in uniform distance from the end of the spindle to provide a locking force uniformly distributed about the shank of the tool.

References Cited

UNITED STATES PATENTS

| | | | |
|---|---|---|---|
| 1,377,663 | 5/1921 | Brown | 279—75 X |
| 1,782,633 | 11/1930 | Schiltz | 279—75 X |
| 2,807,473 | 9/1957 | Kiehne | 279—82 |
| 2,926,020 | 2/1960 | Dayton | 279—75 |
| 3,251,605 | 5/1966 | Ondeck | 279—82 |
| 1,015,266 | 1/1912 | Hardie | 279—22 X |
| 2,733,926 | 2/1956 | Colton | 279—75 |
| 3,185,493 | 5/1965 | Chadwick | 279—82 |

LESTER M. SWINGLE, *Primary Examiner.*

J. C. PETERS, *Assistant Examiner.*

U.S. Cl. X.R.

279—75